US010773448B2

(12) United States Patent
Nürnberg (10) Patent No.: US 10,773,448 B2
(45) Date of Patent: Sep. 15, 2020

(54) MANUFACTURING METHOD FOR AN OUTER LAYER FOR A PANEL OF A BALL (71) Applicant: adidas AG, Herzogenaurach (DE)

(72) Inventor: Hans-Peter Nürnberg, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 1040 days.

(21) Appl. No.: 14/865,144

(22) Filed: Sep. 25, 2015

(65) Prior Publication Data
US 2016/0089580 A1   Mar. 31, 2016

(30) Foreign Application Priority Data

Sep. 25, 2014 (DE) ................ 10 2014 219 396

(51) Int. Cl.
*B29C 51/02* (2006.01)
*B29C 51/08* (2006.01)
(Continued)

(52) U.S. Cl.
CPC ............ *B29C 51/082* (2013.01); *A63B 41/08* (2013.01); *A63B 43/008* (2013.01); *A63B 45/00* (2013.01); *B29C 33/42* (2013.01); *B29C 51/14* (2013.01); *B29C 51/145* (2013.01); *B29C 59/021* (2013.01); *B29C 59/022* (2013.01); *B29D 22/02* (2013.01); *B29D 22/04* (2013.01);
(Continued)

(58) Field of Classification Search
None
See application file for complete search history.

(56) References Cited

U.S. PATENT DOCUMENTS 2,891,280 A * 6/1959 Politis ................... B29C 31/004
229/400
3,458,380 A * 7/1969 Kipp ....................... B29C 65/02
156/309.6

(Continued)

FOREIGN PATENT DOCUMENTS

CN    1152883    6/1997
CN    101524894    9/2009
(Continued)

OTHER PUBLICATIONS

Japanese Application No. 2015-187569, Office Action dated Jun. 26, 2018, 11 pages (5 pages of English Translation and 6 pages of Official Copy).
(Continued)

*Primary Examiner* — Edmund H Lee
(74) *Attorney, Agent, or Firm* — Kilpatrick Townsend & Stockton LLP (57) ABSTRACT

Described are methods for manufacturing an outer layer for a panel of a ball, in particular of a football, an outer layer manufactured with such a method as well as a panel and a ball comprising such an outer layer. The method includes shaping a sheet of material in a mold, wherein the mold is formed in such a way that during shaping, the sheet of material assumes a three-dimensional shape of the outer layer of the panel. Moreover, the method includes creating first textures in at least a first partial region on a first side of the sheet of material and creating second textures in at least a second partial region of the sheet of material.

19 Claims, 7 Drawing Sheets

(51) Int. Cl.
  *B29C 51/14* (2006.01)
  *A63B 41/08* (2006.01)
  *B29C 33/42* (2006.01)
  *B29D 22/02* (2006.01)
  *A63B 43/00* (2006.01)
  *B29D 22/04* (2006.01)
  *A63B 45/00* (2006.01)
  *B29C 59/02* (2006.01)
  *B29L 31/54* (2006.01)
  *A63B 71/06* (2006.01)

(52) U.S. Cl.
  CPC ... *A63B 2071/0655* (2013.01); *A63B 2225/01* (2013.01); *A63B 2243/0025* (2013.01); *B29L 2031/545* (2013.01)

(56) References Cited

U.S. PATENT DOCUMENTS

| | | | | |
|---|---|---|---|---|
| 4,115,173 | A * | 9/1978 | Qualey | B29C 59/022 156/120 |
| 4,130,619 | A * | 12/1978 | Held | B29C 39/00 156/245 |
| 4,584,157 | A * | 4/1986 | Sweig | B29C 37/0053 264/293 |
| 5,150,906 | A * | 9/1992 | Molitor | A63B 37/0003 156/145 |
| 6,309,582 | B1 * | 10/2001 | Wu | B29C 35/12 156/219 |
| 6,500,372 | B1 * | 12/2002 | Frankefort | B27N 3/08 264/102 |
| 6,749,794 | B2 * | 6/2004 | Spengler | B29C 37/0032 264/101 |
| 8,501,063 | B2 * | 8/2013 | Nowik | B29C 51/10 264/134 |
| 2002/0074257 | A1 * | 6/2002 | Heath | B29C 51/14 206/461 |
| 2002/0180089 | A1 * | 12/2002 | Frankefort | B27N 3/08 264/102 |
| 2003/0067100 | A1 * | 4/2003 | Kato | B29C 45/1418 264/511 |
| 2003/0218786 | A1 * | 11/2003 | Yao | B29C 33/3878 359/2 |
| 2012/0172160 | A1 * | 7/2012 | Marc | B29D 22/02 473/604 |
| 2014/0179469 | A1 * | 6/2014 | Berggren | A63B 45/00 473/604 |

FOREIGN PATENT DOCUMENTS

| | | |
|---|---|---|
| CN | 103282085 | 9/2013 |
| DE | 102009016287 | 11/2010 |
| EP | 1424105 | 6/2004 |
| EP | 2243520 | 10/2010 |
| GB | 2232114 | * 12/1990 |
| GB | 2375054 | 11/2002 |
| JP | 2009153541 | 7/2009 |
| JP | 2010240427 | 10/2010 |
| JP | 2013144150 | 7/2013 |

OTHER PUBLICATIONS

Japanese Patent Application No. 2015-187569, Office Action dated Dec. 11, 2018, 8 pages (5 pages for the original document and 3 pages for the English translation).
German Patent Application No. 102014219396.6, "Office Action" dated Apr. 13, 2015, 5 pages (No English translation available. A summary of the Office Action is provided in the accompanying Transmittal).
Thermoplastic Elastomer, Wikipedia, the free encyclopedia, Retrieved from the internet: URL:https://web.archive.org/web/20130628143838/http://en.wikipedia.org/wiki/Thermoplastic_ elastomer, Jun. 28, 2013, 4 pages.
European Application No. 15186381.8, Office Action dated Sep. 21, 2017, 5 pages.
European Application No. 15186381.8, Extended European Search Report dated Feb. 8, 2016, 7 pages.
Chinese Application No. 201510622810.5, Office Action dated May 18, 2017, 15 pages (8 pages of English translation and 7 pages of original document).

* cited by examiner

MANUFACTURING METHOD FOR AN OUTER LAYER FOR A PANEL OF A BALL

CROSS REFERENCE TO RELATED APPLICATION

This application is related to and claims priority benefits from German Patent Application No. DE 10 2014 219 396.6, filed on Sep. 25, 2014, entitled Manufacturing Method for an Outer Layer for a Panel of a Ball ("the '396 application"). The '396 application is hereby incorporated herein in its entirety by this reference.

FIELD OF THE INVENTION

The present invention relates to a method for manufacturing an outer layer for a panel of a ball, in particular a football, an outer layer manufactured with the method as well as a panel and a ball comprising such a layer.

BACKGROUND

Balls, in particular sport balls, such as footballs, comprise a cover with a plurality of panels in many cases, which are sewed, glued or otherwise connected to each other. The panels are nowadays mostly made from plastics, but they may also comprise natural leather.

For example, EP 1 424 105 B1 describes a method for manufacturing three-dimensional parts of a ball, in particular of a football, the parts comprising an outer material and a backing material, as well as a method for manufacturing a ball from such parts.

For the optical design of such balls, the surface of the individual panels and/or of the completely assembled ball may be imprinted or sprayed with color, for example. However, on the one hand, this has the disadvantage that the optical design applied in this manner is rapidly impaired by abrasion or removed due to the influence of kicks, hits, bounces on the floor, etc. On the other hand, this process also only enables a simple two-dimensional optical design with colored patterns, images, graphical characters and the like. Effects which appear three-dimensional are either not achievable or are difficult to achieve in this manner.

In order to avoid the aforementioned abrasion, methods for the optical design of panels of a ball are known in the art which comprise imprinting a foil on its inside. The foil imprinted in this manner may be applied to a panel. Since the optical design elements are located on the inside of the foil, they are protected from abrasion by the foil to a large extent. Moreover, such a foil may also protect the panel of the ball itself from outer influences such as abrasion, moisture, sharp objects, etc.

The aerodynamic properties of the ball made from the panels constitute a further factor to be taken into consideration in the manufacture of panels for balls. It has turned out, particularly with footballs, that a surface of the ball which is too smooth may have a negative effect on the flying properties and result in the ball "chattering", for example. Furthermore, a surface of a ball which is too smooth may also have negative effects on the usability of the ball, e.g. during a football match on a wet grass pitch.

In order to avoid such effects, various structured surfaces or balls or individual panels of such balls are known in the art.

For example, DE 10 2009 016 287 B3 describes an inflatable ball, in particular a football, with an outer cover comprising a plurality of panels, the panels being connected with each other by seams and each panel comprising a pseudo-seam which extends at least along a part of the outer surface of the panel. Furthermore, DE 10 2009 016 287 B3 discloses that the panels may also comprise a surface texture.

It is a disadvantage of the ball panels or balls, respectively, known in the art, however, that the optical as well as the haptic and aerodynamic aspects are typically influenced by separate elements of the panels and the ball and that a plurality of different manufacturing steps and manufacturing devices are therefore required. This, on the one hand, makes the constructive set-up of such a ball more complicated, and on the other hand, the durability and resilience of the panels and the ball may suffer therefrom.

Based on this prior art, it is therefore a problem underlying the present invention to provide simplified manufacturing methods for ball panels which allow influencing both the haptic and the aerodynamic properties of the panels in an advantageous way and to an improved extent while simultaneously increasing durability and resilience of the panels and the balls manufactured from them against external influences.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a method for manufacturing an outer layer for a panel of a ball comprises shaping a sheet of material in a mold, wherein the mold is formed in such a way that during shaping, the sheet of material assumes a three-dimensional shape of the outer layer of the panel, creating first textures in at least a first partial region on a first side of the sheet of material, and creating second textures in at least a second partial region on a second side of the sheet of material.

In some embodiments, shaping the sheet of material comprises pressing with a plunger element. The mold may be formed in such a way that during pressing, the mold at least partially creates the first textures, and wherein the plunger element is formed in such a way that during pressing, the plunger element at least partially creates the second textures. In these embodiments, the first textures are at least partially created during pressing by corresponding indentations in the mold or on the plunger element, and wherein the second textures are at least partially created during pressing by corresponding protruding elements in the mold or on the plunger element.

In further embodiments, shaping the sheet of material comprises deep-drawing into the mold. In these embodiments, the first textures are at least partially created by the mold having corresponding indentations and by inserting a flowable material into the mold before shaping the sheet of material.

According to some embodiments, at least one of the first textures and the second textures is at least partially created by minting or high-pressure-forming.

According to further embodiments, the sheet of material is additionally subjected to a heat treatment.

In some embodiments, the first side is an outer side of the sheet of material facing away from the panel of the ball and wherein the second side is an inner side of the sheet of material facing towards the panel of the ball.

In certain embodiments, third textures are additionally created, which extend along at least one of the first side and the second side.

The first textures may comprise dimensions of 0.1 mm-0.5 mm and/or the second textures may comprise dimensions of less than 0.1 mm. In some embodiments, at least one of the first textures and the second textures can evoke an absorption of light and/or a refraction of light.

In some embodiments, the sheet of material is a textile carrier, a cast plastic layer, a plastic foil, or a combination thereof.

According to certain embodiments of the present invention, a method for manufacturing an outer layer for a panel of a ball comprises shaping a plastic foil in a mold so that the plastic foil assumes a three-dimensional shape of the outer layer of the panel, creating first textures in at least a first partial region on a first side of the plastic foil, and creating second textures in at least a second partial region on a second side of the plastic foil.

In some embodiments, the plastic foil is permeable for light at least in a partial region. Before shaping, the plastic foil may comprise a thickness of 0.2 mm-0.6 mm. In further embodiments, the plastic foil comprises one or more of the following materials: acrylonitrile-butadiene-styrene, thermoplastic (poly-) urethane.

According to some embodiments, the plastic foil comprises a base layer and a decoration layer. The base layer may comprise acrylonitrile-butadiene-styrene and/or thermoplastic (poly-) urethane, and wherein the decoration layer may comprise thermoplastic (poly-) urethane and a thickness of 0-200 μm. In these embodiments, the decoration layer is arranged on the first side of the plastic foil and the base layer is arranged on the second side of the plastic foil. The decoration layer may further comprise a light-reflecting material.

An outer layer for a panel of a ball may be manufactured with a method as described above. A panel of a ball may comprise such an outer layer, and a ball may comprise such a panel.

BRIEF DESCRIPTION OF THE DRAWINGS

In the following detailed description, embodiments of the invention are described referring to the following figures.

BRIEF DESCRIPTION

According to an aspect of the invention, this problem is at least partially solved by a method for manufacturing an outer layer for a panel of a ball, in particular a football, wherein the method comprises shaping a sheet (e.g. essentially planar, two-dimensional, or flat) material in a mold, wherein the mold is formed in such a way that during shaping, the sheet of material assumes a three-dimensional shape of the outer layer of the panel. Additionally, the method comprises creating first textures in at least a first partial region on a first side of the sheet of material and creating second textures in at least a second partial region on a second side of the sheet of material.

Thus, the method according to the invention allows manufacturing, in a particularly easy manner, an outer layer for a panel of a ball, in particular a football, which can provide a plurality of functions.

Assuming the desired three-dimensional shape facilitates the possibility that the outer layer for the panel of a ball manufactured from the sheet of material and the panel itself can be connected to each other in a largely form-fitted manner. On the one hand, this may be beneficial in order to ensure the necessary stability of a ball manufactured from such inventive panels including outer layers, and, on the one hand, in order to largely avoid negatively affecting the game-play and usage properties of such a ball. In this way, the outer layer may in particular be provided with a foamed plastic material on its back side to create the panel.

The creation of the first and/or second textures, which may be effected and controlled independently from three-dimensionally shaping the sheet of material with the inventive method, allows influencing the aerodynamic and haptic as well as the optical properties of the finished panels or balls, respectively, in a plurality of ways. Herein, it may be beneficial that the entire outer layer for a panel can be manufactured integrally, which leads to increased resilience and durability of the outer layer and thus ultimately also of the finished panels or balls, respectively.

It is possible that shaping the sheet of material comprises pressing with a plunger element.

For example, the shaping can be solely effected by such pressing, which constitutes a particularly easy procedural option. On the other hand, it is also possible that the shaping comprises further possibilities which will be described in the following. Moreover, analogous statements also apply to all other possibilities of shaping the sheet of material which are described herein.

In certain embodiments, the mold is formed in such a way that during pressing, the first textures are at least partially created, and that the plunger element is formed in such a way that during pressing, the second textures are at least partially created.

When speaking about a partial creation of the textures in this context, this means that on the one hand, the textures may be solely created by the option currently discussed. On the other hand, however, further possibilities discussed herein may contribute to the creation of the textures.

In particular, the first textures may at least partially be created during pressing by corresponding indentations in the mold and/or the second textures may at least partially be created during pressing by corresponding protruding elements on the plunger element. The opposite case is also possible, i.e. the first textures may at least partially be created during pressing by corresponding protruding elements in the mold and/or the second textures may at least partially be created during pressing by corresponding indentations in the plunger element. In certain embodiments, the mold or the plunger element, respectively, comprises both indentations as well as protruding elements that contribute to the creation of the first or second textures, respectively, during pressing.

On the one hand, this allows largely doing without a pre-texturing of the sheet of material or the like. Moreover, molds or plunger elements with indentations or protruding elements, respectively, are particularly easy tools to manufacture and well suited for use within suitable manufacturing devices. Thus, the method according to the invention allows a particularly simple and economic manufacture of outer layers for ball panels according to the invention.

In certain embodiments, shaping the sheet of material comprises deep-drawing into the mold.

In this manner, it may be achieved that the sheet of material nestles against the mold particularly well and thereby, for example, takes over mold-textures that are present in the mold for the creation of the first textures, e.g. indentations or protruding elements, particularly well.

It is also possible that the first textures are at least partially created by the mold having corresponding indentations—or more generally corresponding mold-textures in the mold—and by inserting a flowable (e.g. fluid) material into the mold before shaping the sheet of material.

Such a flowable material may, for example, be (poly-) urethane or thermoplastic (poly-) urethane, which may be provided with a low viscosity. In this manner, also subtle and complex first textures may be created, which may not or only under significantly increased effort be created solely by pressing into a mold with indentations or protruding elements, respectively.

It is mentioned here that the use of such a flowable material can, in principle, also be used for the creation of the second textures or contribute to it.

Moreover, in certain embodiments, the first textures and/or the second textures are at least partially created by minting or high-pressure-forming, for example by use of a highly focused airstream with high pressure, or a combination thereof. It is once again mentioned that the different possibilities for creating the first and/or second textures may be appropriately combined.

These further options may again enlarge the spectrum of first and second textures that may be created.

The sheet of material may additionally be subjected to a heat treatment. Here, the heat treatment may occur before shaping of the sheet of material, for example before pressing or deep-drawing, but also simultaneously with shaping in the sense of a thermoforming process. The deformability of the sheet of material can be increased by the heat treatment, for example, so that the manufacturing process is facilitated and the creation of the first and second textures, respectively, is also facilitated. After such a manufacturing process has been completed, an additional cooling process may additionally be carried out, which results in an at least partial hardening of the sheet of material and thus the manufactured outer layer for the panel and in an increase of their stability.

For example, the first side is an outer side of the sheet of material facing away from the panel of the ball and the second side is an inner side of the sheet of material facing towards the panel of the ball.

Thus, the first textures on the first side, for example, may primarily serve the purpose of influencing the haptic and aerodynamic properties of a panel or ball, respectively, equipped with such an outer layer, whereas the second textures on the second side may primarily serve the optical design and are largely protected from outer influences. However, it is also possible that the first textures and/or the second textures each serve the purpose of influencing the haptic and aerodynamic as well as the optical properties.

Influencing the haptic properties may on the one hand improve the feeling when using the ball and its general appearance. The influence may, however, also affect technical characteristics of the ball, e.g. increase its grip and contact surface. The possibilities of influencing the optical properties increase the design freedom for the manufacture of balls and may allow for a customization.

Optionally, third textures are additionally created, e.g. during pressing or deep-drawing, which extend on the first side and/or on the second side and/or on the first side as well as on the second side of the sheet of material.

Such third textures may, for example, be created during pressing by further indentations and/or protruding elements in the mold and/or on the plunger element. For example, by an indentation in the mold and a corresponding protruding element on the plunger element, third textures "penetrating" the sheet of material may be created which are designed such that a protrusion is created on the first side of the sheet of material and a corresponding indentation is created on the second side of the sheet of material, or vice versa. In other embodiments of the method, the third textures only extend on the first and/or the second side, without "penetrating" the sheet of material, and the third textures may be both indentation-like and protruding textures. Moreover, the further possibilities for the creation of the first and/or second textures discussed herein may also contribute to the creation of the third textures. Such third textures, for example, allow further influencing the haptic, aerodynamic and optical properties of the outer layer for panels or balls, respectively. It is also possible that the third textures form "sub-textures" within the first and/or second textures or, vice versa, that the first and/or second textures form "sub-textures" within the third textures.

In certain embodiments, the first textures comprise dimensions of 0.1 mm-0.5 mm. First textures of such dimensions, for example, may have a beneficial effect on the aerodynamic properties, e.g. steadiness of flight, and the haptic properties, e.g. "grip" in case of moisture.

Moreover, the second textures may comprise dimensions of less than 0.1 mm. Second textures of such dimensions are particularly well suited for influencing the optical properties of the outer layer, for example by refraction of light.

In particular, the first and/or the second textures, and potentially the third textures, too, may evoke an absorption of light and/or a refraction of light. This may, as was already mentioned, further influence the appearance of the finished panel or ball, respectively, including the outer layer manufactured according to the invention, particularly when subject to the incidence of light. This may, in particular, cause effects which appear three-dimensional. For example, under the incidence of light, a change of color of the outer layer may be effected depending on the depth of the first, second and potentially third textures.

In certain embodiments, the sheet of material comprises a textile carrier. The textile carrier may comprise a fiber-reinforced material, a fleece material, a finely knitted material, a woven material or a felt material. Moreover, the textile carrier may have an optical design printed on it.

The textile carrier may thus serve to influence the optical as well as haptic and aerodynamic properties. It may also increase the tear resistance of the outer layer.

In certain embodiments, the sheet of material comprises a plastic layer, for example a cast plastic layer and in particular a cast plastic coat. It is, in particular, possible that a sheet of material with a textile carrier comprises a cast plastic layer or a cast plastic coat, respectively.

The cast plastic layer or the cast plastic coat may, e.g., be a transparent layer or a transparent coat, respectively, such that an underlying layer or optical design may remain visible. As possible materials for the plastic layer/the plastic coat, e.g. (poly-) urethane or thermoplastic (poly-) urethane may be considered. These materials lead to a haptically valuable and largely UV-resistant surface, in particular for a plastic layer provided on the first side facing away from the panel. Furthermore, these materials may be provided with a low viscosity, which facilitates the application of the plastic layer or the plastic coat, respectively.

In certain embodiments, the plastic layer is only cast on the first side of the sheet of material or only on the second side. In principle, it is also possible that the plastic layer is applied by a method different from casting, e.g. by spraying or the like.

Further, in certain embodiments, the plastic layer is applied to both sides of the sheet of material and thus forms a plastic coat. It is, however, also possible that the plastic material is arranged within the interior of the sheet of material, and so forth. The plastic layer or the plastic coat may moreover be applied in a partial region of the sheet of material only, for example in partial region where the first or second textures, respectively, are created.

It is further mentioned here that such a plastic layer or a plastic coat may also be applied to the sheet of material during the shaping of the sheet of material and/or the creation of the first, second and potentially third textures. In principle, it is also possible that the plastic layer or the plastic coat is only applied to the sheet of material after the remaining procedure, in particular only after the shaping of the sheet of material and the creation of the first, second and potentially third textures, has been completed, such that the plastic layer or the plastic coat, respectively, cover the textures and protect them from abrasion and other adverse influences.

It is also possible that the sheet of material comprises a plastic foil.

The sheet of material may, for example, consist of a plastic foil. In certain embodiments, the outer layer is manufactured by pressing a plastic foil with a plunger element into a mold.

Also here, however, reference is made to the possibility that such a plastic foil is only applied to the sheet of material during or after completion of the remaining process for the manufacture of the outer layer, for example by way of a further deep-drawing process and for example on the outer side facing away from the panel of the ball, such that the foil may cover the textures and protect them from abrasion and other adverse influences. Also, the application of multiple plastic foils is possible in this regard, or a combination with the application of a plastic layer or a plastic coat, respectively, cf. above.

Finally, reference is made to the possibility that such a plastic foil itself comprises a layered construction, as further illustrated below by way of a specific example having a base layer and a decoration layer.

In summary, the sheet of material may already comprise a layered construction in its base state, i.e. before shaping of the sheet of material and creation of the first, second and potentially third textures. Alternatively, further layers, like one or more of the above described plastic layers or a plastic coat or one or more plastic foils or textile layers, may be applied to the sheet of material during or after completion of the remaining procedure, in particular during or after shaping of the sheet of material and/or creation of the first, second and potentially third textures. One might think of an injection molded thermoset reinforcement layer or a design foil, for example on the inner side facing towards the panel of the ball.

It is, in particular, possible that the plastic foil is permeable for light at least in a partial region. Hence, the light may, for example, advance through the plastic foil to the second textures on the second, e.g. inner side of the plastic foil and be reflected, mirrored, refracted, scattered, etc. This may influence the optical appearance of the finished panel or ball, respectively, particularly when subject to the incidence of light. Furthermore, a plastic foil which is at least partially permeable for light may allow the panel of the ball underneath it to be at least partially visible.

It is possible that the plastic foil comprises a thickness before shaping, in particular before pressing, of 0.2 mm-0.6 mm, and more specifically, may comprise a thickness of 0.2 mm-0.4 mm.

Such a thickness constitutes a compromise between a thickness which is selected sufficiently large to enable the desired influence of the properties of the panel or the ball, respectively, and which, on the other hand, is low enough so as not or not significantly to affect negatively the weight and other properties which are relevant to the use.

The plastic foil may, for example, comprise one of several of the following materials: acrylonitrile-butadiene-styrene, thermoplastic (poly-) urethane.

These materials may be beneficial for manufacturing an outer layer as described herein, particularly using the methods according to the invention described herein. In this regard, each of these materials entails its specific substance and processing properties, which may be used or combined with each other depending on the profile of requirements.

As a further possibility, the plastic foil may comprise a layered construction, in particular a base layer and a decoration layer. Furthermore, such a plastic foil with layered construction may also comprise a reinforcement layer, for example a textile carrier as discussed above.

Herein, the base layer, for example, comprises acrylonitrile-butadiene-styrene and/or thermoplastic (poly-) urethane and the decoration layer may comprise thermoplastic (poly-) urethane and a thickness of 0 µm-200 µm, and more specifically may comprise a thickness of 90 µm-110 µm.

The base layer may, for example, provide the necessary basic stability and thickness of the plastic foil which is necessary for creating the first, second and potentially third textures, while the decoration layer provides a further possibility for optical design, which can be applied essentially independently from or also in combination with the further possibilities discussed herein for optical, haptic and aerodynamic design. In this context, the materials and layer thicknesses specified above may be beneficial.

In certain embodiments, the decoration layer is arranged on the first side of the plastic foil and the base layer is arranged on the second side of the plastic foil. This set-up allows, in particular, additionally influencing the optical properties directly at the surface of the finished panel or ball, respectively, while it is also possible that the danger of abrasion of the decoration layer serving the purpose of optical design is largely avoided due to the tight and potentially integral connection of the decoration layer and the base layer. A different set-up is, however, also possible. For example, the arrangement of the base layer in relation to the decoration layer may change locally, the base layer and the decoration layer may e.g. constitute two interwoven layers.

It is further possible that the decoration layer comprises a light-reflecting material. The reflectivity may be developed to different degrees. In particular, the decoration layer may appear matt or glossy. The light reflecting material may, e.g., be used in order to create the impression of three-dimensional design effects, in particular in combination with the possibilities for optical design described herein.

Further aspects of the invention relate to an outer layer for a panel of a ball, in particular of a football, manufactured with one of the methods described herein, a panel of a ball, in particular of a football, which comprises such an outer layer, as well as a ball, in particular a football, manufactured from such panels.

Such a panel may, for example, be manufactured by providing an inventive outer layer with a foamed plastic material on its back side. From such panels, a finished ball may be manufactured by sewing, gluing or welding of the panels.

Panels or balls, respectively, with an outer layer manufactured according to the invention particularly comprise, as was already mentioned, allow the outer layer to provide protection from external influences such as abrasion, carves or cuts, moisture and the like, while simultaneously allowing the aerodynamic and haptic as well as optical properties of the panel or ball, respectively, to be influenced independently from one another, or also in combination, with reduced production efforts.

Certain embodiments of the method may be implemented as an automated production process, at least to a large degree. For example, the desired structure and design of an outer layer, or a panel or a ball, to be produced may first be created within a 3D-simulation. Based on this simulation, a manufacturing site may be caused to manufacture the corresponding outer layer, or already the complete panel or ball. The computation of the necessary manufacturing- and control-parameters may take into account the rounded form of the product. During this process, the design of the outer layer may be adapted to the coloring of elements lying below, for example of a foamed panel material used in the creation of the panel.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In the following detailed description, certain embodiments of the invention will be described primarily with regard to methods and products for the manufacture of footballs. However, it is emphasized that the present invention is not limited to this area but may also be used in the manufacture of other types of balls or more generally sporting goods.

It also has to be taken into consideration that, depending on the profile of requirements for the respective panel or the respective ball, various ones of the described aspects and steps can be combined with each other or individual aspects or steps may be left unconsidered provided that they are not relevant to the respective panel, the respective ball or the respective good. Such embodiments are also to be considered as being part of the invention.

Figure 1:
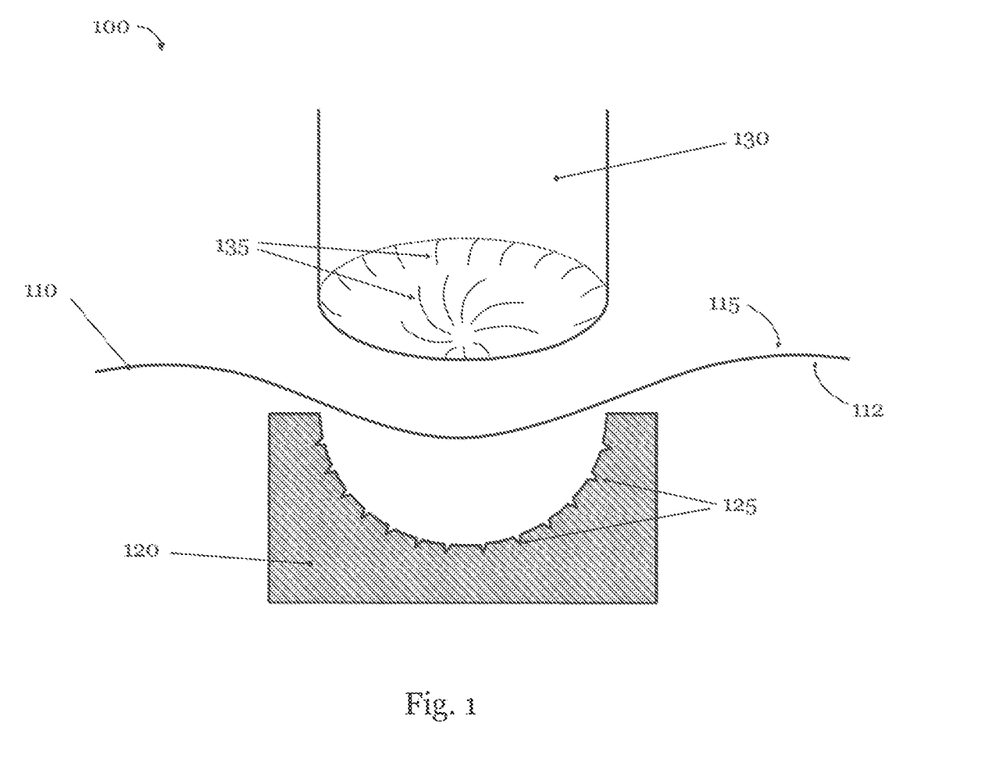
FIG. 1 is an illustration of a method for manufacturing an outer layer for a panel of a ball, in particular a football, according to certain embodiments of the present invention.

FIG. 1 schematically shows a method 100 for manufacturing an outer layer for a panel of a ball, in particular a football.

The method 100 comprises the shaping of a sheet of material 110 in a mold 120, wherein the mold 120 is formed in such a way, that the sheet of material 110 assumes a three-dimensional shape of the outer layer of the panel during shaping. The method 100 further comprises the creation of first textures in at least a first partial region on a first side 112 of the sheet of material 110 and the creation of second textures in at least a second partial region on a second side 115 of the sheet of material 110.

All connected or disconnected parts of the respective side of the sheet of material shall be understood as a partial region.

The method 100 may, as shown in FIG. 1, comprise pressing a sheet of material 110, here a plastic foil 110, into a mold 120 with a plunger element 130. The mold 120 and the plunger element 130 are formed in such a way that during pressing the plastic foil 110 assumes a desired three-dimensional shape of the outer layer of the panel. The mold 120 is furthermore formed in such a way that during pressing, the mold 120 at least partially creates the first textures on the first side 112 and the plunger element 130 is formed in such a way the during pressing, it at least partially creates the second textures on the second side 115. Moreover, the thickness and/or the material density of the plastic foil 110 may be influenced by pressing.

For example, the first textures are created at least partially during pressing by corresponding indentations 125 in the mold and the second textures are created at least partially during pressing by correspondingly protruding elements 135 on the plunger element 130, or vice versa.

Further embodiments of the method are, however, also conceivable, as already described in detail further above. The shaping may, in particular, also comprise deep-drawing of the sheet of material 110 into the mold 120 and/or the sheet of material 110 may additionally be subjected to a heat treatment.

The creation of the first and/or second textures may also be achieved in a different way or comprise other possibilities. The first textures may, in particular, at least partially be created by the mold 120 having corresponding indentations 125 and by inserting a flowable material (not shown) into the mold 120 before shaping of the sheet of material 110.

It is also possible that the first and/or second textures are at least partially created by minting or high-pressure-forming. For example, the sheet of material 110 may be pressed into the mold 120 by a focused high-pressure airstream, thereby creating the first and/or second textures at least partially.

Moreover, the sheet of material 110 need not be a plastic foil 110, as shown here. Rather, the sheet of material 110 may, e.g., comprise a textile carrier, it may comprise one or more cast plastic layers or plastic layers applied otherwise or a plastic coat, and it may comprise further layers or components in addition to a plastic foil. Also, such textile carriers, plastic layers/coats or plastic foils may also be applied or added during or after the completion of the method 100 illustrated here.

For the reason of simplification, the method 100 illustrated in FIG. 1 will in the following be further discussed for the special case of the pressing of a plastic foil 110. It will be apparent to the skilled person, however, that all further possibilities mentioned herein mays also be used. Insofar, reference is made to the more detailed considerations put forth in section 3. ("Summary of the invention") of this document.

The first side 112 may be an outer side facing away from the panel of the ball and the second side 115 is an inner side facing towards the panel of the ball.

For example, via a combination of a mold 120 with indentations 125 and a plunger element 130 with protruding elements 135, inventive outer layers for ball panels, which assume the desired three-dimensional shape of the surface of the ball panel, can be manufactured in a particularly simple manner while simultaneously imprinting the desired first and/or second textures on the latter.

Optionally, it is also possible for third textures to be created with the method, which extend on the first side 112 of the plastic foil 110 and/or on the second side 115 of the plastic foil 110 and/or both on the first side 112 of the plastic foil 110 and on the second side 115 of the plastic foil 110 and which are created with additional indentations and/or protruding elements in the mold 120 or on the plunger element 130, respectively, which do not correspond to the indentations 125 and protruding elements 135 mentioned above for creating the first or second textures, respectively. This also includes textures "penetrating" the plastic foil 110: For example, during pressing the plunger element 130 may create an indentation-like texture on the second side 115 of the plastic foil 110. If the dimensions of this indentation-like texture are large enough in relation to the thickness of the plastic foil 110, this may result in a corresponding texture on the first side 112 of the plastic foil 110 during pressing, depending on the precise shape of the mold 120 in this area (for example, if the mold 120 comprises a corresponding indentation in this area), so that the created third texture is not only located on one side of the plastic foil 110, but quasi "penetrates" the plastic foil 110, as it were. In contrast, in other embodiments, the third textures only extend on the first side 112 and/or the second side 115 of the plastic foil 110 without penetrating it. Here, the third textures on each of the two sides of the plastic foil 110 may be indentation-like as well as protruding third elements, which may be created during pressing by further indentations/protruding elements, for example, in the mold 120 or on the plunger element 130, respectively (which, as was mentioned already, may not correspond to the indentations 125 or the protruding elements 135, respectively).

It has to be taken into consideration in this regard that the illustration of FIG. 1 is a strongly schematized illustration, which merely serves the purpose of clarifying the basic principle of the method according to the invention. Herein, the dimensions and precise design features, such as of the plastic foil 110, the mold 120 including the indentations 125 and the plunger element 130 including protruding elements 135 do not necessarily represent the real conditions to be encountered when the method 100 according to the invention is actually used.

In certain embodiments, the first textures comprise dimensions in the range from 0.1 mm to 0.5 mm, whereas the second textures comprise dimensions of less than 0.1 mm. Here, the dimensions of the textures are to be understood as their typical spatial extension. This may, for example, be given by the depth or the diameter or the like being measured for a plurality of such textures and the measurement values being subsequently averaged (e.g. by arithmetic averaging).

For channel-like textures, "dimensions" shall always refer to their depth and width, but not their length.

As will be discussed in more detail in connection with the embodiments of an inventive outer layer 220 for a panel of a ball shown in FIGS. 2a-f, textures with such dimensions are particularly suited for influencing the aerodynamic, haptic and optical properties of a ball panel or of a ball, respectively.

Here, it may be beneficial for influencing the optical design features of the panel or of the ball, respectively, if the first and/or the second textures are designed such that they may cause absorptions of light and/or refractions of light. In the context of this document, the term "refraction of light" comprises the phenomenon of diffuse refraction of light and/or of light scattering as well as the generation of (punctual) light-reflexes and mirror-like effects. This allows the outer layer to be designed such that shadow-like effects, for example, are caused in individual partial regions of the outer layer, for example in regions in which the first and/or second textures cause absorption of light and/or scattering of light which is stronger compared to other regions of the outer layer. Due to the combination of such textures, it is particularly possible to create optical effects which appear three-dimensional, i.e. effects which go beyond a simple two-dimensional optical design of the surface of the panel or the ball, respectively. In this regard, it may be beneficial if the plastic foil 110 is permeable for light at least in partial regions, e.g. in one or several partial regions in which first and/or second textures are located. In this regard, a plastic foil 110 is to be considered permeable for light if it lets through at least a portion of the incident light, i.e. if it does not fully absorb and/or reflect the incident light, for example.

In order to enable the first and/or second (and potentially third) textures being created while simultaneously not excessively negatively affecting the weight and other properties relevant to game-play, it may be beneficial for a sheet of material 110 provided as a plastic foil 110 to have a thickness before shaping, in particular in the case of pressing, between 0.2 mm and 0.6 mm, and more specifically may have a thickness before shaping between 0.2 mm and 0.4 mm. A plastic foil 110 of this thickness comprises a sufficient material thickness for impressing the desired textures and sufficient stability to meet the desired protection functions of the outer layer, for example, such as protection against abrasion, cuts, moisture, etc. On the other hand, however, it is also thin enough so as not to considerably increase the weight of the ball or negatively affect its deformability and behavior in case of kicks or hits. In this regard, particularly sufficient deformability of the outer layer has to be maintained, since an outer layer of a panel or ball, respectively, which is too rigid might otherwise easily cause injuries to a player (e.g. a footballer when kicking or of a volleyball player when hitting) and might furthermore negatively affect the elasticity properties of the ball.

In order to meet these requirements, acrylonitrile-butadiene-styrene and/or thermoplastic (poly-) urethane may be beneficial as the materials for a plastic foil 110 for use with the manufacturing method 100 according to the invention described herein. These materials are particularly easy to process and comprise a combination of substance-specific properties for use in the method 100 described herein or variants thereof.

In order to facilitate the three-dimensional shaping of the plastic foil 110 and the creation of the first and/or second (and potentially third) textures, the plastic foil 110 may additionally be subject to a heat treatment, as already mentioned before. For example, the plastic foil 110 can be heated up and thus softened, for example, before it is inserted into the mold 120, so that its ability to assume the shape of the mold 120 and of the plunger element 130 is improved and so that impressing the first and/or second (and potentially third) textures by the indentations 125 or the protruding elements 135, respectively, (and potentially further indentations/protruding elements for the creation of the third textures) is furthermore facilitated. Certain embodiments of the method 100 according to the invention in which the plastic foil 110 is subject to such heat treatment during pressing may be desirable. For this purpose, the mold 120 and/or the plunger element 130 may for example be electrically heated or streamed through by a heated liquid.

In order to further optimize the manufacturing process 100, the plastic foil 110 may, for example, be suctioned or deep drawn against the mold 120 by negative pressure, as also already mentioned before. For this purpose, the mold 120, for example, comprises small openings (not shown), which are connected to a negative-pressure system (not shown, either). Such a thermoforming method comprises certain embodiments of the inventive method 100. Furthermore, the plastic foil 110 may be subject to a cooling process or to cold treatment, respectively, either still inside the mold 120 or after it has been removed from the mold 120. This may be used for increasing dimensional stability and/or firmness of the outer layer created in that way, for example. It is apparent to a person skilled in the art that by suitably varying the manufacturing parameters, such as pressure or forming pressure, duration and temperature of the heat treatment and/or the cold treatment as well as the starting material and the starting thickness of the plastic foil 110, etc., the properties of the outer layer manufactured using the method 100 according to the invention, particularly its dimensional stability and flexibility, can be further influenced.

In order to enable even further influencing, in particular, the optical properties of the panel or ball, respectively, it may be beneficial if the plastic foil 110 is constructed from several layers. Here, it may be desirable if the plastic foil 110 comprises a base layer and a decoration layer. Herein, the base layer may assume the tasks which were already described above, such as providing a sufficient thickness for impressing the textures with a simultaneously sufficient protective function and flexibility, etc., whereas the decoration layer may serve the optical design in a manner that is largely unaffected by these requirements. In certain embodiments, the plastic foil 110 comprises a base layer which comprises acrylonitrile-butadiene-styrene and/or thermoplastic (poly-) urethane, for example, at a thickness (before pressing) of 0.2 mm-0.6 mm, and more specifically may have a thickness (before pressing) of 0.2 mm-0.4 mm, whereas the decoration layer comprises thermoplastic (poly-) urethane, for example at a thickness (before pressing) of 0-200 µm, and more specifically may have a thickness (before pressing) of 90 µm-110 µm.

For the optical design, the decoration layer may furthermore comprise a light-reflecting material at least in partial regions, with a light-reflecting material being supposed to be understood herein as a material which reflects incident light almost completely, to a certain extent or even only a small proportion thereof, potentially dependent on the angle of incidence of the light or the angle of vision.

Moreover, the decoration layer can at least in partial regions, for example, also be colored, with colored, liquid thermoplastic (poly-) urethane, which is for example particularly resiliently affiliable with a decoration layer made from thermoplastic (poly-) urethane and is thus hardly influenced by abrasion. This also allows the decoration layer to be arranged on the first side 112 (the side facing away from the panel, for example) of the plastic foil 110, with the base layer being arranged on the second side 115 (the side facing towards the panel) of the plastic foil 110. Especially in connection with a decoration layer which comprises a light-reflecting material at least in partial regions mirror-like optical effects can thus be created directly at the surface of the ball. In combination with the first textures located on the first side 112 extending throughout the decoration layer and potentially also the part of the base layer adjacent to the decoration layer, as well as second textures lying underneath that and extending, e.g., on the second side 115 of the base layer facing towards the panel, optical effects can be created which go beyond a simple two-dimensional optical design, as e.g. impressing the surface of the ball.

After completion of the method steps of the manufacturing method 100 according to the invention described herein, potentially superfluous parts of the plastic foil 110, which are not required for the outer layer of the panel (cf. FIGS. 2*a-f*), may be removed and/or further post processing steps on the outer layer manufactured with the inventive method 100 may follow, for example the application of further plastic foils, plastic layers, plastic coats, reinforcement layers or decoration layers, as already mentioned numerous times. After this, the outer layer may be applied, e.g. glued, onto the corresponding panel and/or connected with the panel by further pressure and/or heat treatment, and the finished ball can ultimately be manufactured from the panels manufactured in this way. Alternatively, the outer layer may be provided with a foamed plastic material on its back side to create an inventive panel. All these steps may also be performed during an integrated process within a manufacturing site or production line.

FIGS. 2*a-f* show the product 200 of a manufacturing method according to the invention. What can be seen is a plastic foil 210 which has undergone a method according to the invention, as described above in connection with FIG. 1, for example.

What has to be taken into consideration with these figures, first of all, is that not the entire plastic foil 210 is used as an outer layer for the panel of the ball for which the layer was manufactured here. Merely the area 220, whose dimensions are suggested by the dashed line 225 in FIG. 2*a*, constitutes the actual outer layer for the ball panel. The projecting parts of the plastic foil 210 are cut off before or after the outer layer 220 is applied to the panel or a foamed panel material is provided to the back side of the outer layer 220, for example. As a further possibility, the outer layer 220 or the finished panel is die-cut from the plastic foil 210. (A marking corresponding to line 225 is not shown in FIGS. 2*b-f* so as not to cover further details.) Further post-processing steps may potentially follow. The finished ball can then ultimately be manufactured from such panels.

Figure 2A:
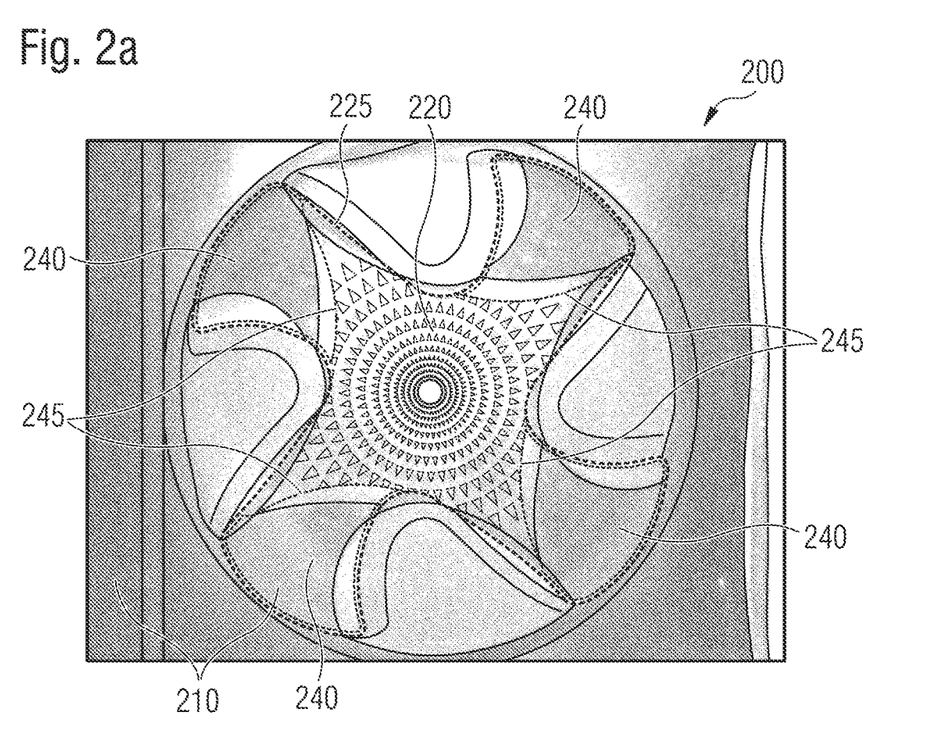
FIGS. 2a-f are images of an outer layer for a panel of a ball, in particular a football, manufactured according to one of the methods described herein, according to certain embodiments of the present invention.
Figure 2B:
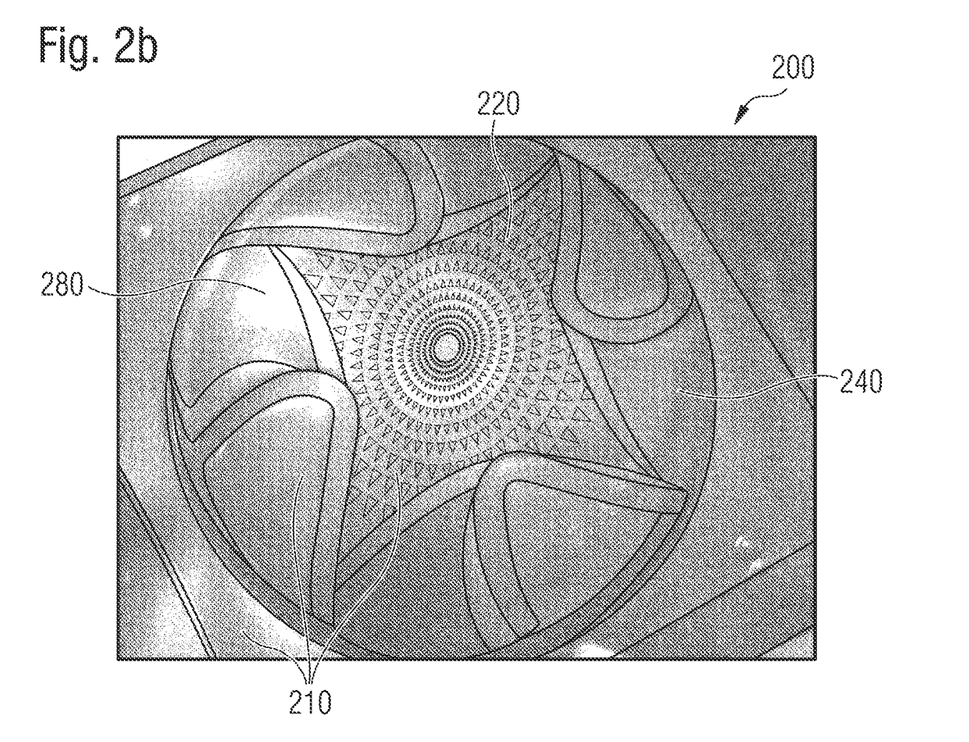
Figure 2C:
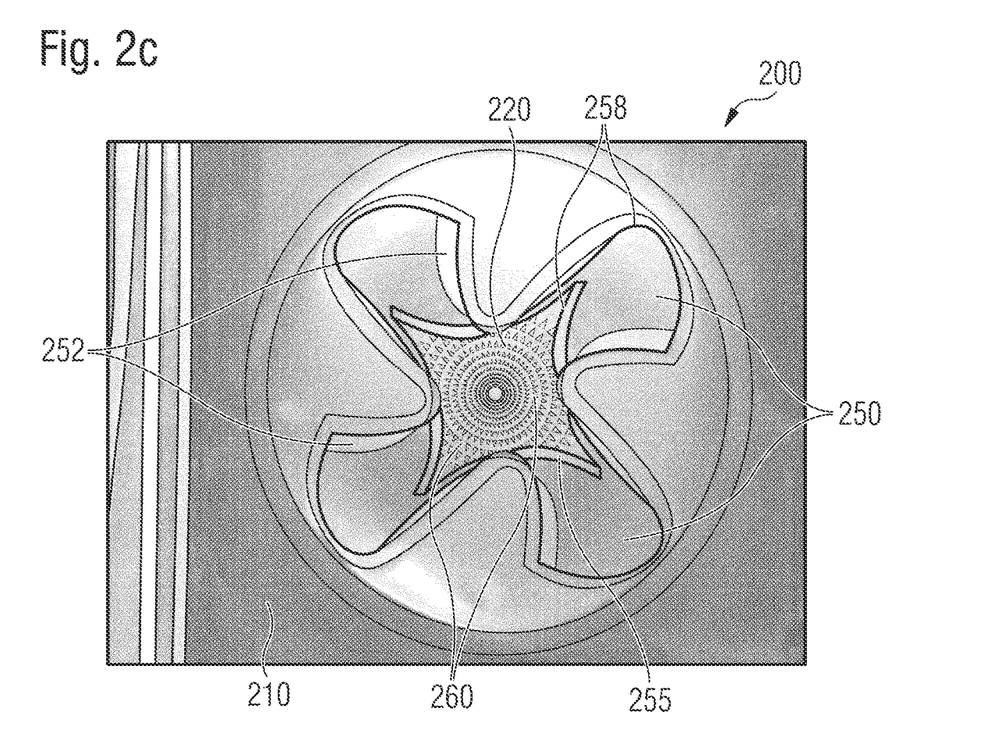
Figure 2D:
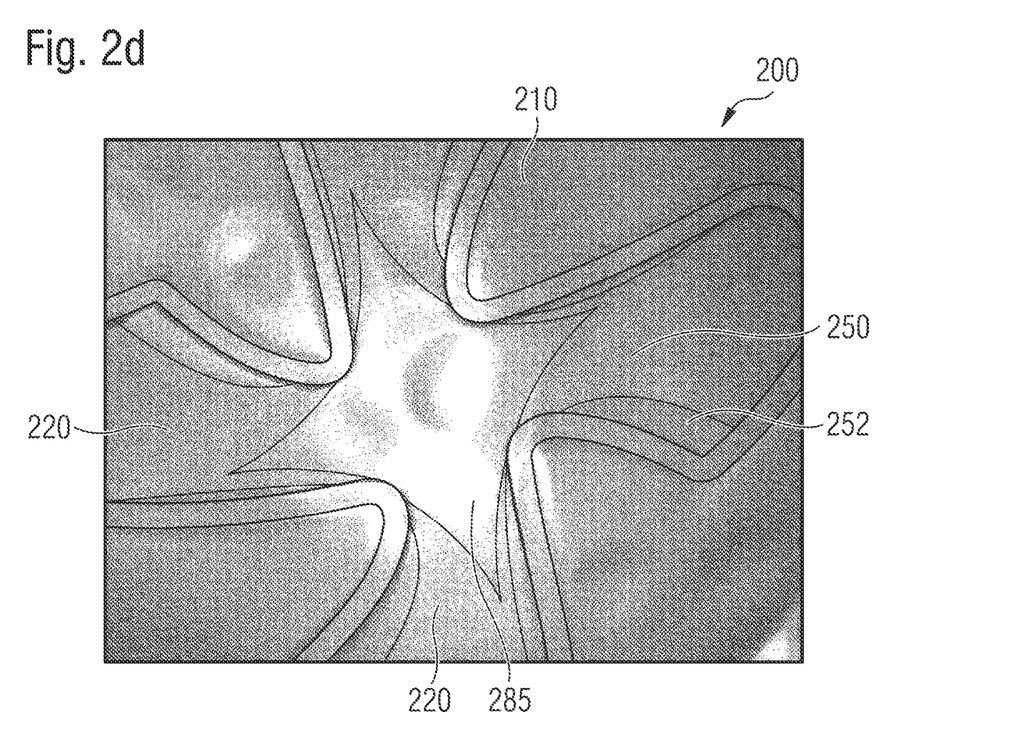
Figure 2E:
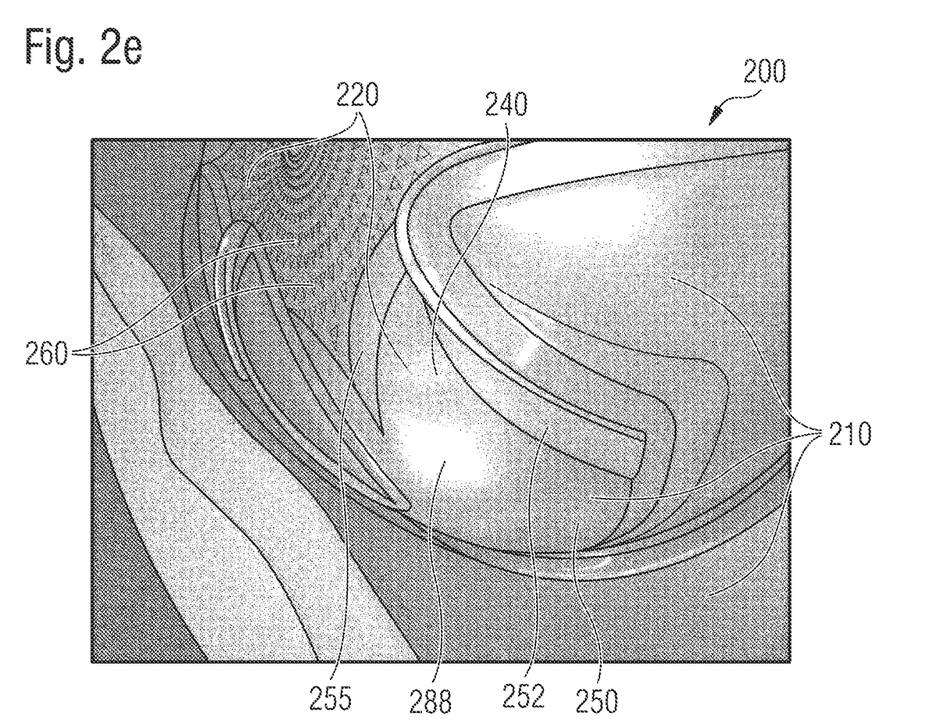
Figure 2F:
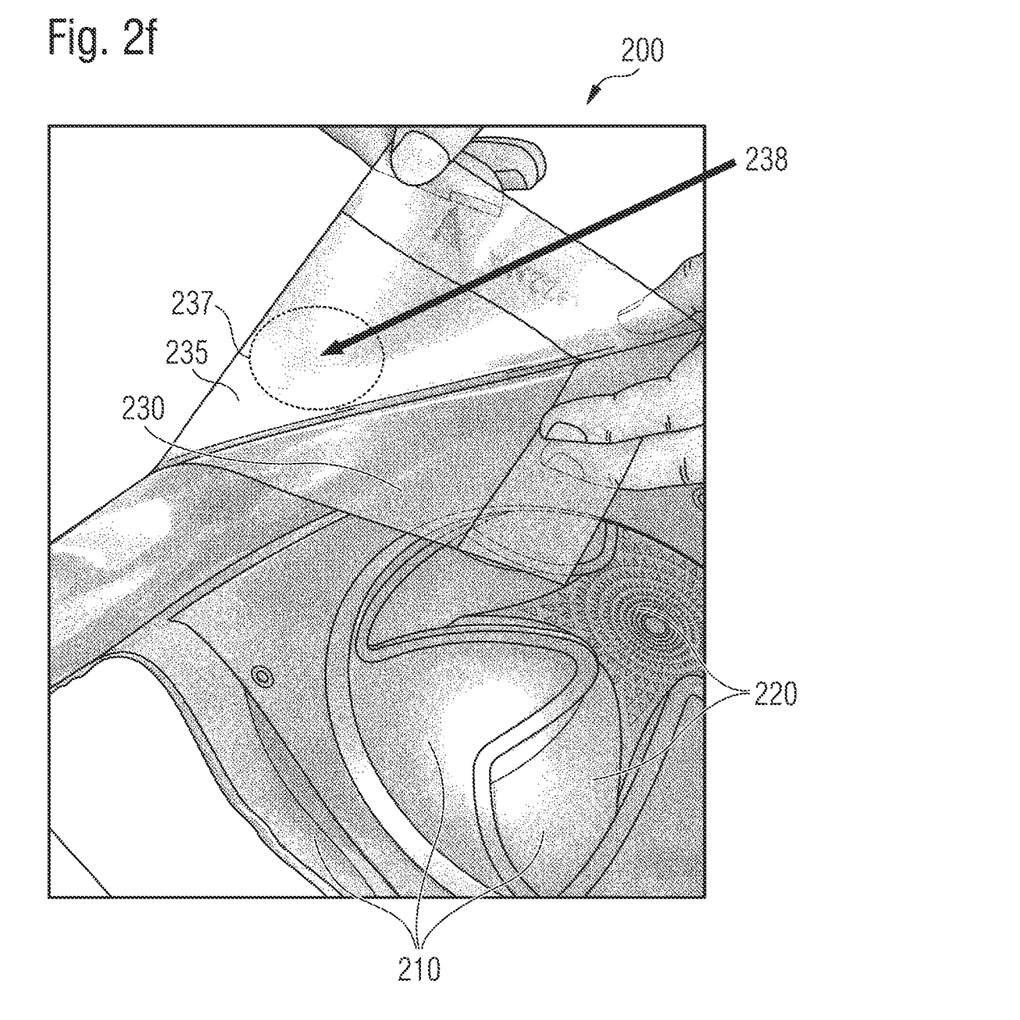

Here, FIGS. 2*a* and 2*b* show a first side of the plastic foil 210/of the outer layer 220 facing away from the panel of the ball, whereas FIGS. 2*c* and 2*d* show a second side of the plastic foil 210/the outer layer 220 facing towards the ball panel. FIG. 2*e* once again shows the first side from a different view angle and FIG. 2*f* illustrates the construction of the plastic foil 210 from a base layer 230 and a decoration layer 235.

As can be seen from FIGS. 2*a-f*, first of all, the plastic foil 210, or rather the part 220 of the plastic foil 210 which is used as the outer layer for a ball panel, has first of all assumed the desired three-dimensional shape of the outer layer 220 due to the manufacturing process according to the invention, so that the outer layer 220 can be connected to the corresponding panel in an essentially (i.e. potentially up to corresponding first, second and/or third textures in the outer layer 220) form-fitted manner or be provided with a foamed material on its back side to create the panel. In order to enable this three-dimensional shaping, among other things, the plastic foil 210 may be subject to heat treatment, as was already mentioned, during or before the manufacturing method, for example.

On the first side of the outer layer 220, i.e. the side facing away from the panel of the outer layer 220, first textures are located in the first partial regions 240. (The dimensions of these partial regions are suggested by the dotted line 245 in FIG. 2*a*). These may, e.g. in case the shaping of the plastic foil 210 is carried out by pressing with a plunger element, be created during pressing by corresponding indentations in the mold, as was already described above in connection with FIG. 1. In the remaining partial regions of the first side of the outer layer 220, no further textures are located in the embodiments shown here, i.e. the first side of the outer layer 220 is essentially (i.e. apart from tolerances due to manufacturing) smooth outside the first partial areas 240.

In other embodiments, first textures are also located in other partial regions of the first side of the outer layer 220.

FIG. 2*b* once again shows the first side of the product 200 from an altered view angle and with a different incidence of light in contrast to FIG. 2*a*. As will be described in detail below, this altered view angle results for example in a reflection of light in the area 280.

FIGS. 2*c* and 2*d* show the second side of the plastic foil 210 or of the outer layer 220, respectively, facing towards the panel of the ball. On this second side, second textures are located in the second partial regions 250, 252 and 255 (the extent of which is suggested by the solid line 258 in FIG. 2*c*), which, e.g. in case the shaping of the plastic foil 210 is carried out by pressing with a plunger element, may be created during pressing by protruding elements on the plunger element, as was already described in connection with FIG. 1.

In the embodiments shown here, the plunger element was designed such that the outer layer 220 comprises different thicknesses and thus material densities after pressing in partial regions 250, 252 and 255. Particularly in combination with the first textures on the first side (cf. above), this results in different optical properties of the outer layer 220 in the various partial regions. For example, permeability for light/transparency of the outer layer is reduced in the partial regions 250 in contrast to the partial regions 252 and 255, so that a kind of shading effect or darkening effect is caused in the partial regions 250.

Moreover, in the embodiments shown here, the second side comprises third textures 260, which only extend on the second, inner side of the outer layer 220 and which are protruding elements which were created by corresponding indentations in the plunger element used for manufacture.

The dimensions of these third textures 260 are considerably larger in the embodiments shown here, for example in the range from 1 mm-5 mm, than the dimensions of the first and second textures in the first partial regions 240 or the second partial regions 250, 252 and 255. As a consequence, the third textures influence the optical properties of the outer layer in a different manner than the first and/or second textures do, which further increases the design freedom for designing the outer layer of the panel/ball.

FIG. 2*d* shows a further detailed view of the inside of the outer layer 220. Here, the different thicknesses of the partial regions 250 and 252, which result in different optical properties of the outer layer 220 in these partial regions, can be seen. Furthermore, due to the view angle and angle of incidence of the light which has been altered in contrast to FIG. 2*c*, a reflection of light shows up in region 285, for example.

FIG. 2*e*, in contrast, shows the first side, facing away from the panel, of the outer layer 220 made from the plastic foil 210 again, once more from a different perspective. The different optical properties of the outer layer 220 caused by the first textures in the first partial regions 240 of the first side and by the second textures in the various second partial regions 250, 252, 255 of the second side, as well as a reflection of light in region 288, for example, are visible.

As can further be seen from FIG. 2*f*, the plastic foil 210 comprises a base layer 230 as well as a decoration layer 235 in the present case. Here, the base layer 230 comprises acrylonitrile-butadiene-styrene and thermoplastic (poly-) urethane, whereas the decoration layer 235 comprises thermoplastic (poly-) urethane and a thickness of approximately 100 μm, the base layer 230 being arranged on the side facing towards the panel and the decoration layer 235 being arranged on the side facing away from the panel.

Moreover, the decoration layer 235 comprises a material, at least in partial regions, which at least partially reflects incident light. In the present case, this material and its distribution within the decoration layer 235 are designed such that the decoration layer 235 and thus also the outer layer 220, depending on the angle of incidence of the light or on the view angle from which the decoration layer 235 is considered, reflects the light incident from the front (i.e. incident onto the side of the decoration layer 235 facing towards the viewer) largely or only in part, and therefore largely or at least partially "blinds out" light incident from the back (i.e. incident from the side of the decoration layer 235 facing away from the viewer) and crossing the decoration layer 235. This may result in the decoration layer 235 appearing non-permeable for light and like a mirror in case of strong reflection of the light incident from the front and thus a strong blinding out of the light incident from the back. In the view angle shown in FIG. 2*f*, for example, the decoration layer 235 reflects the light incident from the side of the viewer in the direction of the arrow 238 almost completely in the region 237 and in this region almost completely blinds out light coming from the back of the decoration layer 235 and penetrating the decoration layer 235 from there. Thus, the decoration layer 235 appears non-permeable for light and like a mirror e.g. in the region 237 for someone looking at FIG. 2*f*. From another view angle or angle of incidence of the light, however, this behavior changes and the decoration layer 235 becomes at least partially transparent, cf. FIGS. 2*a* and 2*c*, for example.

Whereas in the above discussion of the embodiments shown in FIGS. 2*a-f*, the optical properties of the outer layer or of the panel/ball were mainly talked about, it is apparent to the person skilled in the art, however, that the possibilities of influence discussed here may at least also partially serve the purpose of influencing the haptic and/or aerodynamic properties.

In the following, further examples are described to facilitate the understanding of the invention:

1. Method (100) for manufacturing an outer layer (220) for a panel of a ball, in particular a football, wherein the method comprises:
   a. shaping of a planar material (110; 210) in a mold (120),
   b. wherein the mold (120) is formed in such a way that during shaping, the planar material (110; 210) assumes a three-dimensional shape of the outer layer (220) of the panel;

c. creating first textures in at least a first partial region (240) on a first side (112) of the planar material (110; 210); and
d. creating second textures in at least a second partial region (250; 252; 255) on a second side (115) of the planar material (110; 210).

2. Method according to example 1, wherein shaping the planar material (110; 210) comprises pressing with a plunger element (130).

3. Method according to example 2, wherein the mold (120) is formed in such a way that during pressing, the mold (120) at least partially creates the first textures, and wherein the plunger element (130) is formed in such a way that during pressing, the plunger element (130) at least partially creates the second textures.

4. Method according to example 3, wherein the first textures are at least partially created during pressing by corresponding indentations (125) in the mold (120) and/or wherein the second textures are at least partially created during pressing by corresponding protruding elements (135) on the plunger element (130), or vice versa.

5. Method according to one of the preceding examples, wherein shaping the planar material (110; 210) comprises deep-drawing into the mold (120).

6. Method according to one of the preceding examples, wherein the first textures are at least partially created by the mold (120) having corresponding indentations (125) and by inserting a flowable material into the mold (120) before shaping the planar material (110; 210).

7. Method according to one of the preceding examples, wherein the first textures and/or the second textures are at least partially created by minting or high-pressure-forming.

8. Method according to one of the preceding examples, wherein the planar material (110; 210) is additionally subjected to a heat treatment.

9. Method according to one of the preceding examples, wherein the first side (112) is an outer side of the planar material (110; 210) facing away from the panel of the ball and wherein the second side (115) is an inner side of the planar material (110; 210) facing towards the panel of the ball.

10. Method according to one of the preceding examples, wherein third textures (260) are additionally created, which extend along the first side (112) and/or along the second side (115) and/or along the first side (112) as well as the second side (115).

11. Method according to one of the preceding examples, wherein the first textures comprise dimensions of 0.1 mm-0.5 mm.

12. Method according to one of the preceding examples, wherein the second textures comprise dimensions of less than 0.1 mm.

13. Method according to one of the preceding examples, wherein the first textures and/or the second textures can evoke an absorption of light and/or a refraction of light.

14. Method according to one of the preceding examples, wherein the planar material (110; 210) comprises a textile carrier.

15. Method according to one of the preceding examples, wherein the planar material (110; 210) comprises a cast plastic layer, in particular a cast plastic coat.

16. Method according to one of the preceding examples, wherein the planar material (110; 210) comprises a plastic foil (110; 210).

17. Method according to example 16, wherein the plastic foil (110; 210) is permeable for light at least in a partial region.

18. Method according to one of the preceding examples 16-17, wherein before shaping the plastic foil (110; 210) comprises a thickness of 0.2 mm-0.6 mm, preferably of 0.2 mm-0.4 mm.

19. Method according to one of the preceding examples 16-18, wherein the plastic foil (110; 210) comprises one or more of the following materials: acrylonitrile-butadiene-styrene, thermoplastic (poly-) urethane.

20. Method according to one of the preceding examples 16-19, wherein the plastic foil (210) comprises a base layer (230) and a decoration layer (235).

21. Method according to example 20, wherein the base layer (230) comprises acrylonitrile-butadiene-styrene and/or thermoplastic (poly-) urethane, and wherein the decoration layer (235) comprises thermoplastic (poly-) urethane and a thickness of 0-200 μm, preferably 90-110 μm.

22. Method according to example 20 or 21, wherein the decoration layer (235) is arranged on the first side of the plastic foil (210) and the base layer (230) is arranged on the second side of the plastic foil (210).

23. Method according to one of the examples 20-22, wherein the decoration layer (235) comprises a light-reflecting material.

24. Outer layer (220) for a panel of a ball, in particular a football, manufactured with a method according to one of the examples 1-23.

25. Panel of a ball, in particular a football, comprising an outer layer (220) according to example 24.

26. Ball, in particular a football, comprising a panel according to example 25.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A method for manufacturing an outer layer for a ball panel having an outer layer with a three-dimensional shape, wherein the method comprises:
   shaping a sheet of material in a mold, wherein the mold is formed in such a way that during shaping, the sheet of material assumes the three-dimensional shape of the outer layer of the ball panel;
   during the shaping of the sheet of material, creating first textures in at least a first partial region on a first surface of the sheet of material; and
   during the shaping of the sheet of material, creating second textures in at least a second partial region on a second surface of the sheet of material opposite to the first surface, wherein the second textures extend into or out of a thickness of the sheet of material without imparting a corresponding protrusion or indentation on the first surface of the sheet of material, wherein the sheet of material having the first and second textures is configured to be affixed to the ball panel without substantial degradation of the first and second textures.

2. The method according to claim 1, wherein shaping the sheet of material comprises pressing with a plunger element; wherein the mold is formed in such a way that during pressing, the mold at least partially creates the first textures, and wherein the plunger element is formed in such a way that during pressing, the plunger element at least partially creates the second textures.

3. The method according to claim 1, wherein the first textures extend into or out of the thickness of the sheet of material without imparting a corresponding protrusion or indentation on the second surface of the sheet of material.

4. The method according to claim 1, wherein the sheet of material is additionally subjected to a heat treatment.

5. The method according to claim 1, wherein the first surface is on an outer side of the sheet of material facing away from the ball panel and wherein the second surface is on an inner side of the sheet of material facing towards the ball panel.

6. The method according to claim 1, wherein third textures are additionally created, which extend along at least one of the first surface and the second surface.

7. The method according to claim 1, wherein the first textures comprise dimensions of 0.1 mm- 0.5 mm.

8. The method according to claim 1, wherein the second textures comprise dimensions of less than 0.1 mm.

9. The method according to claim 1, wherein at least one of the first textures and the second textures can evoke an absorption of light and/or a refraction of light.

10. The method according claim 1, wherein the sheet of material is a textile carrier, a cast plastic layer, a plastic foil, or a combination thereof.

11. The method according to claim 10, wherein the plastic foil is permeable for light at least in a partial region.

12. A method for manufacturing an outer layer for a ball panel having an outer layer with a three-dimensional shape, wherein the method comprises:
shaping a plastic foil in a mold so that the plastic foil assumes the three-dimensional shape of the outer layer of the ball panel;
during the shaping of the plastic foil, creating first textures in at least a first partial region on a first surface of the plastic foil; and
during the shaping of the plastic foil, creating second textures in at least a second partial region on a second surface of the plastic foil opposite to the first surface, wherein the second textures extend into or out of a thickness of the plastic foil without imparting a corresponding protrusion or indentation on the first surface of the plastic foil, wherein the plastic foil having the first and second textures is configured to be affixed to the ball panel without substantial degradation of the first and second textures.

13. The method according to claim 12, wherein the plastic foil is permeable for light at least in a partial region.

14. The method according to claim 12, wherein before shaping, the plastic foil comprises a thickness of 0.2 mm- 0.6 mm.

15. The method according to claim 12, wherein the plastic foil comprises one or more of the following materials: acrylonitrile-butadiene-styrene, thermoplastic (poly-) urethane.

16. The method according to claim 12, wherein the plastic foil comprises a base layer and a decoration layer; wherein the decoration layer is arranged on or forms a portion of the first surface of the plastic foil and the base layer is arranged on or forms a portion of the second surface of the plastic foil.

17. The method according to claim 16, wherein the base layer comprises acrylonitrile-butadiene-styrene and/or thermoplastic (poly-) urethane, and wherein the decoration layer comprises thermoplastic (poly-) urethane and a thickness of 0-200 μm.

18. The method according to claim 12, wherein the first textures extend into or out of the thickness of the plastic foil without imparting a corresponding protrusion or indentation on the second surface of the plastic foil.

19. The method according to claim 17, wherein the decoration layer comprises a light-reflecting material.

* * * * *